G. W. BEADLE.
WELDING MACHINE.
APPLICATION FILED JULY 19, 1909.

1,153,283.

Patented Sept. 14, 1915.
6 SHEETS—SHEET 2.

WITNESSES:
C. L. Belcher
Otto S. Schairer

INVENTOR
George W. Beadle
BY
Wiley S. Carr
ATTORNEY

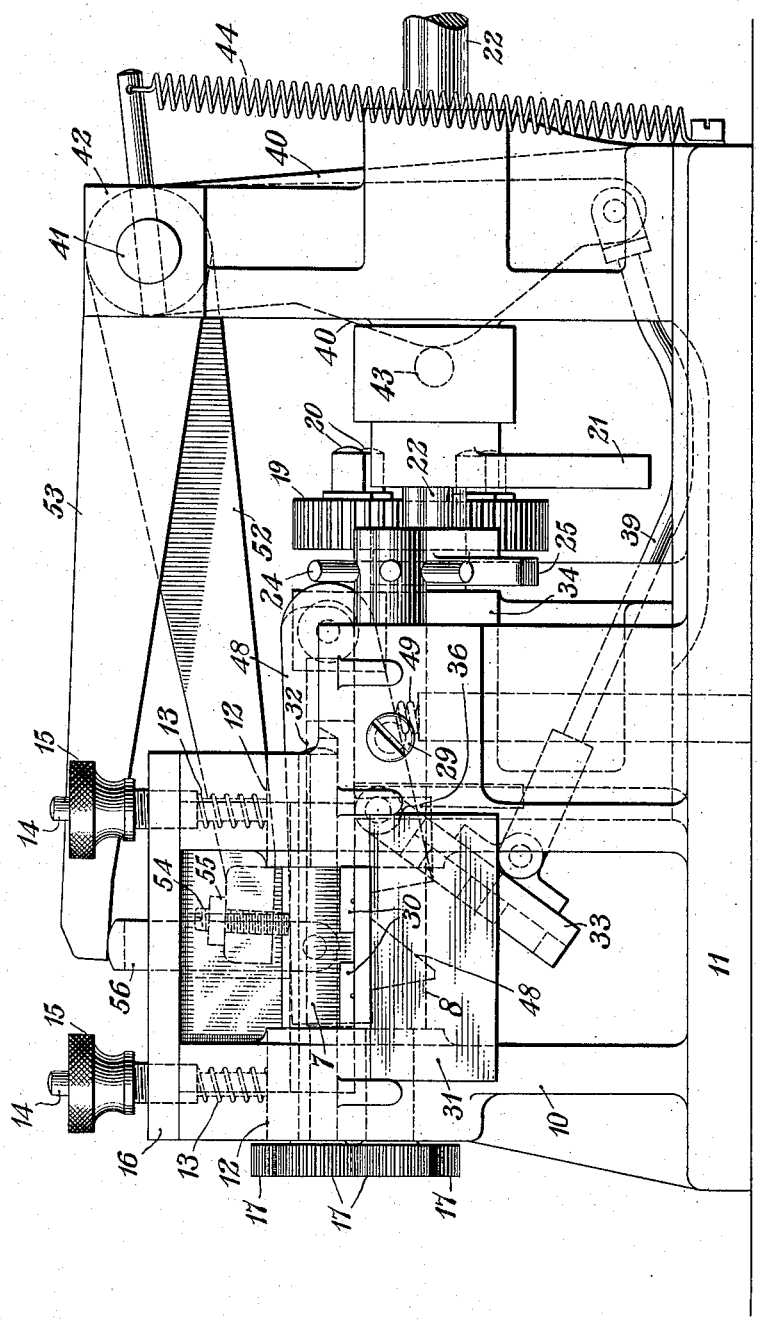

G. W. BEADLE.
WELDING MACHINE.
APPLICATION FILED JULY 19, 1909.
1,153,283.
Patented Sept. 14, 1915.
6 SHEETS—SHEET 4.
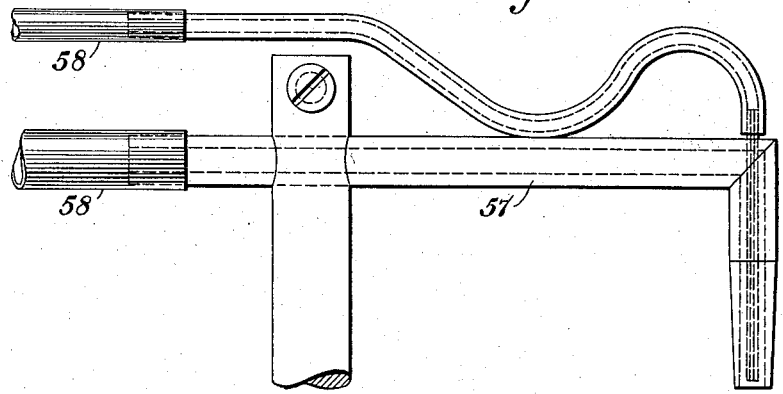
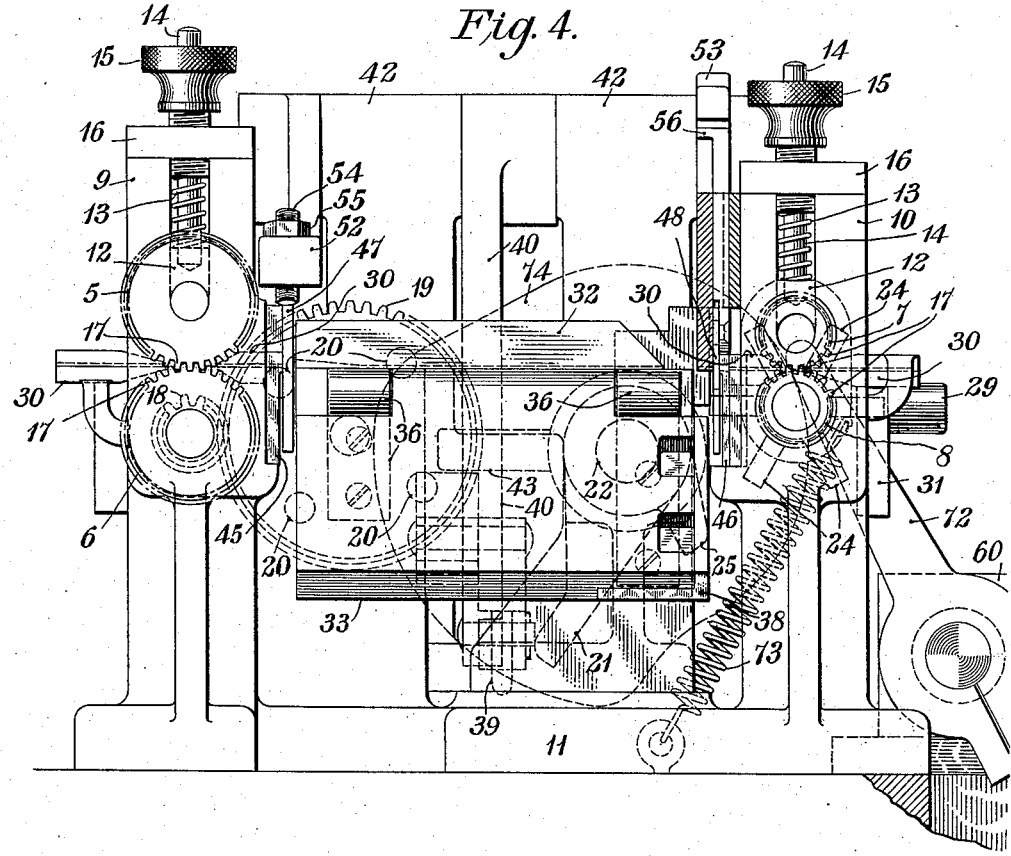

G. W. BEADLE.
WELDING MACHINE.
APPLICATION FILED JULY 19, 1909.
1,153,283.
Patented Sept. 14, 1915.
6 SHEETS—SHEET 5.
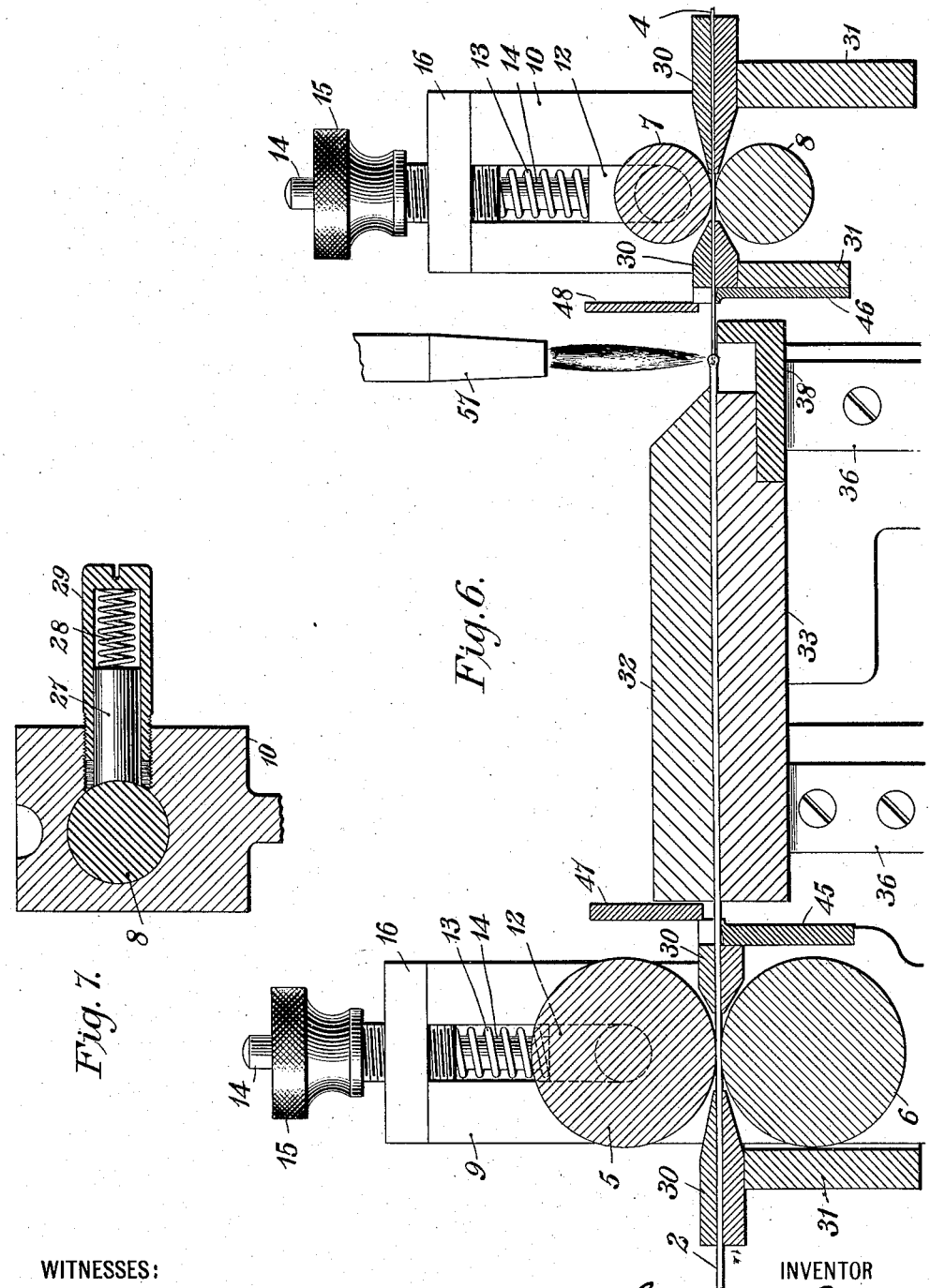
WITNESSES:
C. L. Belcher
Otto S. Schairer
INVENTOR
George W. Beadle
BY
Wesley G. Carr
ATTORNEY G. W. BEADLE.
WELDING MACHINE.
APPLICATION FILED JULY 19, 1909.
1,153,283.
Patented Sept. 14, 1915.
6 SHEETS—SHEET 6.
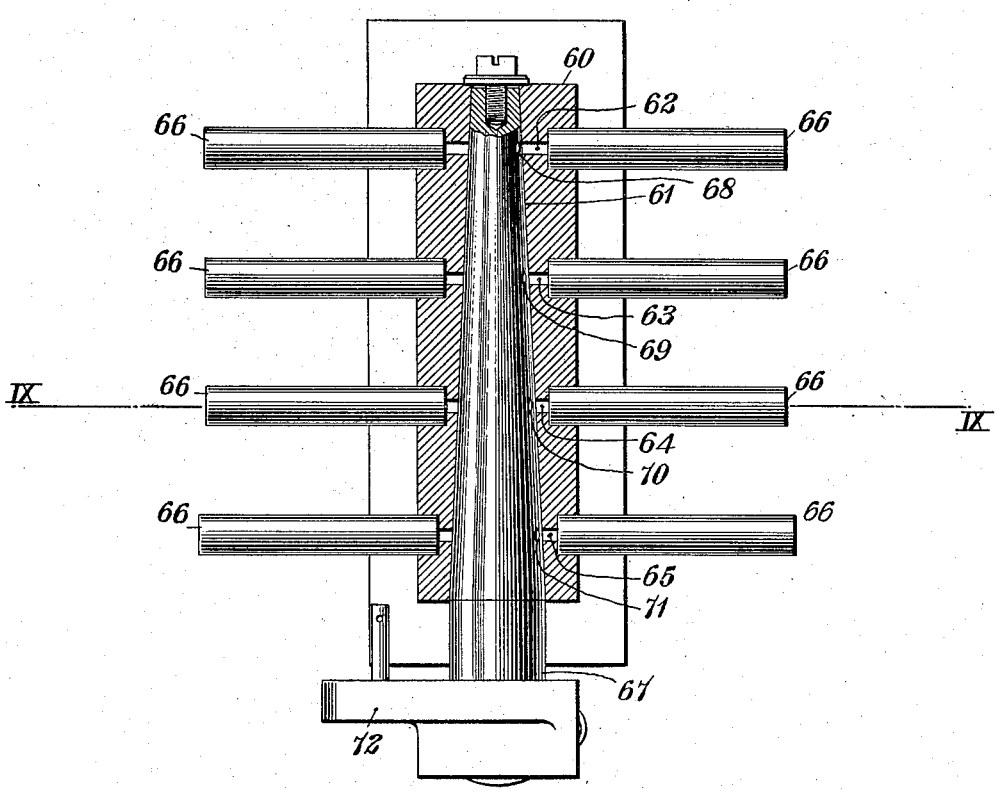
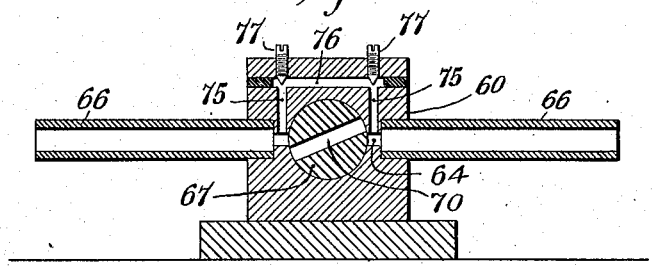
WITNESSES:
C. L. Belcher
Otto S. Schairer
INVENTOR
George W. Beadle
BY
Wesley G. Carr
ATTORNEY

UNITED STATES PATENT OFFICE.

GEORGE W. BEADLE, OF EAST ORANGE, NEW JERSEY, ASSIGNOR TO WESTINGHOUSE LAMP COMPANY, A CORPORATION OF PENNSYLVANIA.

WELDING-MACHINE.

1,153,283.     Specification of Letters Patent.     Patented Sept. 14, 1915.

Application filed July 19, 1909. Serial No. 508,537.

*To all whom it may concern:*

Be it known that I, GEORGE W. BEADLE, a citizen of the United States, and a resident of East Orange, in the county of Essex and State of New Jersey, have invented a new and useful Improvement in Welding-Machines, of which the following is a specification.

My invention relates to machines utilized in the manufacture of electric incandescent lamps, and it has for its object to provide a machine whereby the platinum sections of the leading-in wires of incandescent lamps may be automatically and rapidly welded to the other sections.

Since platinum has substantially the same co-efficient of expansion as glass, it is particularly useful for conducting current through the bulbs of incandescent lamps to and from the filaments thereof, and the leading-in wires of such lamps, accordingly, usually comprise short pieces of platinum wire that are welded to the ends of copper wires, the platinum wires being sealed and embedded in the glass to provide air-tight joints. Heretofore, the welding together of the platinum and copper wires has been effected manually, an operation which is both expensive and slow and which results in a non-uniform product. The present machine effects the operation automatically, and at a very high rate of speed, each machine being the equivalent, in capacity, of a large number of manual operators.

Figure 1:
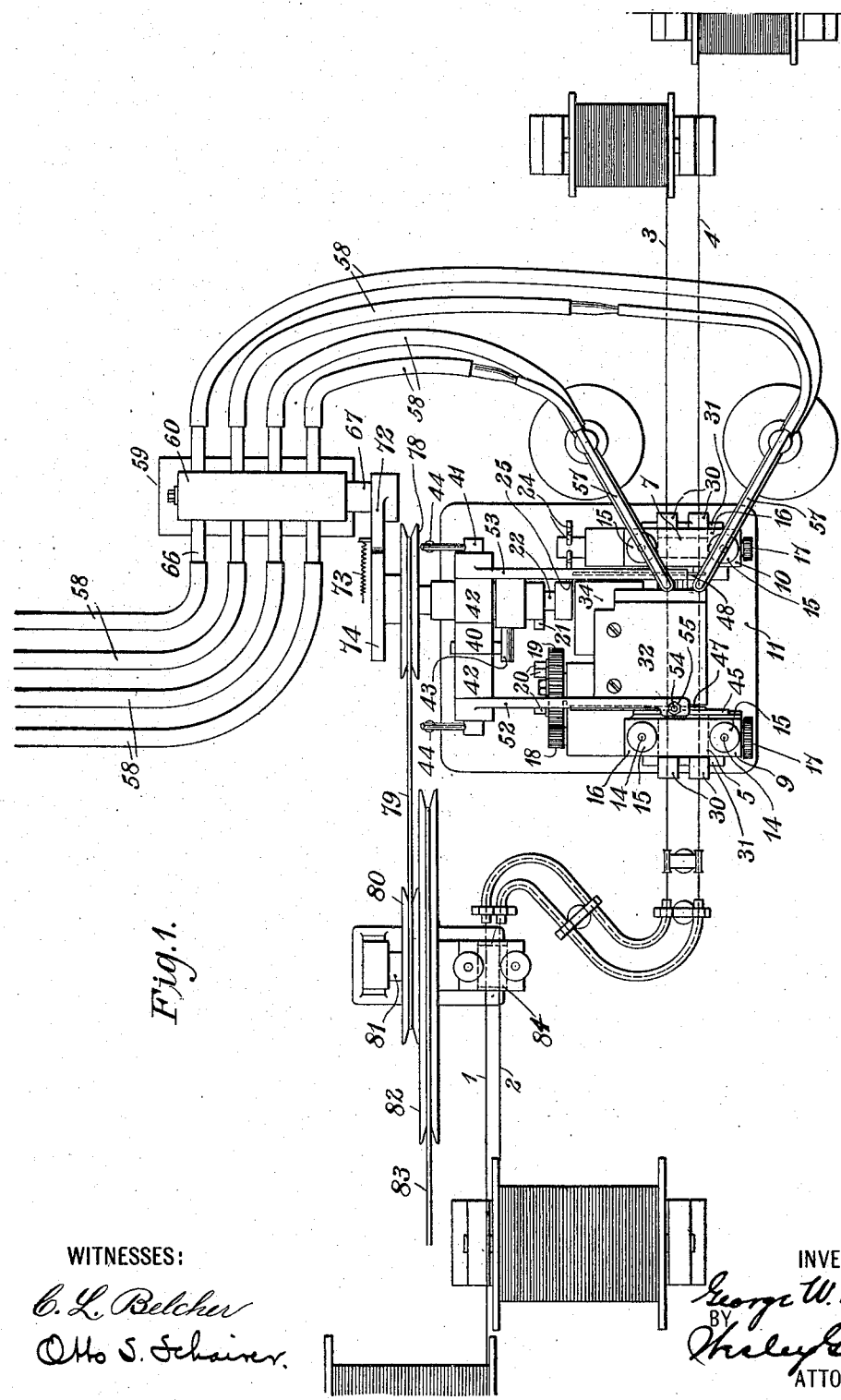
Figure 2:
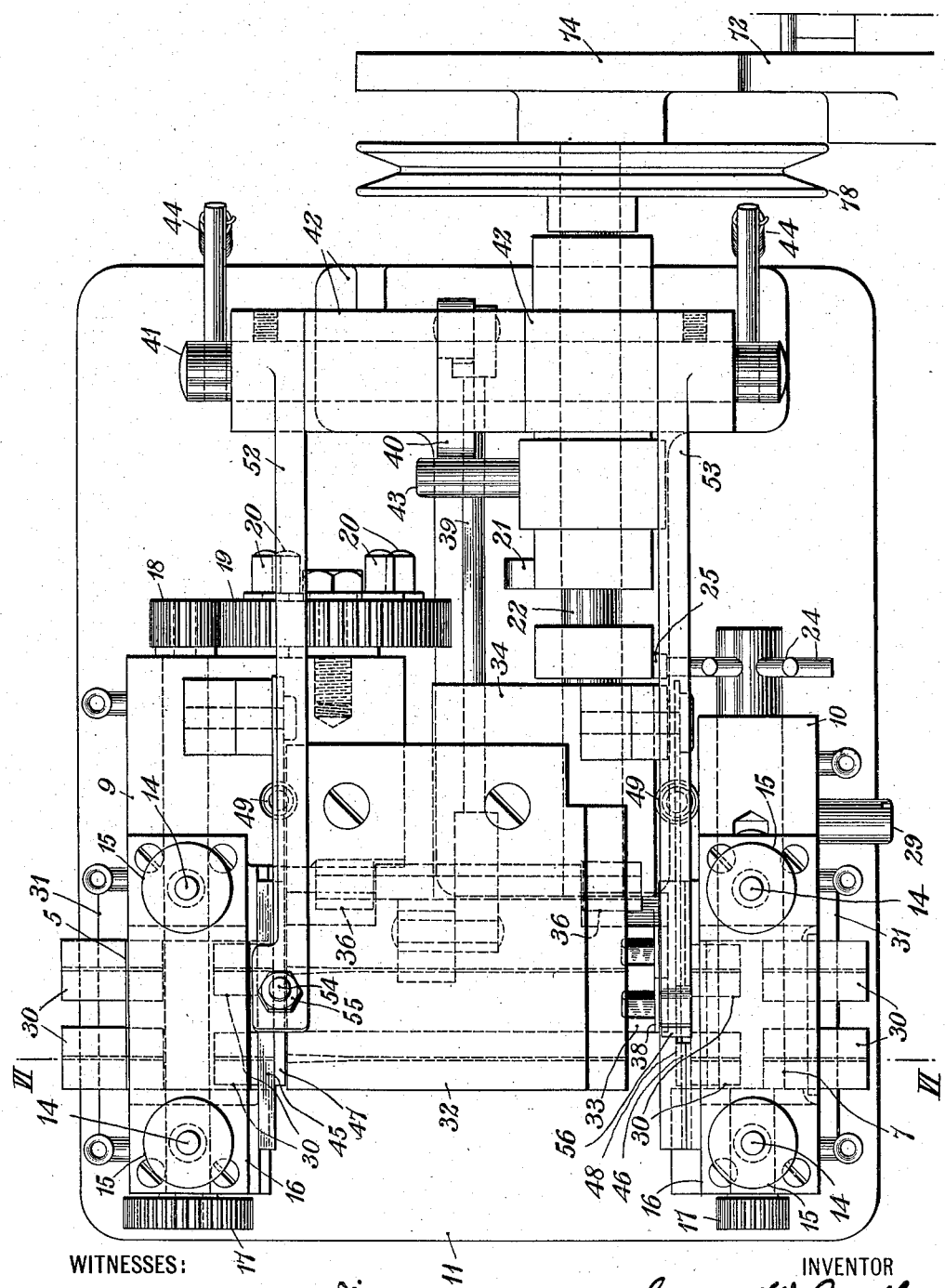

The invention is illustrated in the accompanying drawings, Figure 1 of which is a plan view of the machine and auxiliary apparatus. Fig. 2 is a plan view of the welding machine proper. Fig. 3 is a view in side elevation of the machine of Fig. 2. Fig. 4 is a view in end elevation of the machine. Fig. 5 is a side view of the torches of the apparatus. Fig. 6 is a sectional view on the line VI—VI of Fig. 2. Fig. 7 is a sectional view illustrating the devices for retarding the operation of the feed rolls of the machine. Fig. 8 is a sectional view of the means for governing the gas supply to the machine, and Fig. 9 is a sectional view on the line IX—IX of Fig. 8.

The wires 1—2 and 3—4 to be welded are advanced in alinement from opposite sides of the machine toward and into engagement with each other by means of two parallel sets of feed rolls 5—6 and 7—8 that are rotatably mounted in pedestals 9 and 10 upon a base 11, the wires 1—2 that are advanced by the rolls 5—6 being of copper or other suitable low-resistance material and the wires 3—4 that are advanced by the rolls 7—8 being of platinum or other suitable material that preferably has the same co-efficient of expansion as the glass through which it is to pass. The pedestals 9 and 10 are slotted for the reception of the reduced bearing ends of the upper rolls 5 and 7 of each set and to permit of vertical adjustment of the said rolls. Also located in the slots in the pedestals, and bearing upon the reduced ends of the rolls, are blocks 12 upon the upper faces of which bear helical compression springs 13 that surround rods 14 the lower ends of which are secured in the blocks. The rods 14 project vertically through thumb-nuts 15 that are threaded in plates 16 secured upon the tops of the pedestals 9—10, the said nuts serving both to guide the rods 14 and as means for adjusting the pressures exerted by the springs 13 upon the blocks 12, as well as the pressures exerted by the rolls 5 and 7 upon the wires fed thereby. The feed rolls are operatively connected, at one end, by means of gears 17 and, at the opposite end, the roll 16 is provided with a pinion 18 that meshes with a gear 19 having pins 20 spaced approximately 90° apart secured to one of its faces. The pins 20 are interposed in the path of movement of a cam 21 that is carried by the main driving shaft 22 of the machine, the gear 19 being thereby moved through an angle of 90° for each revolution of the main driving shaft. The roll 8 is provided, at the end opposite the gears 17, with a plurality of radially projecting and equally spaced pins 24 that are disposed in the path of movement of a cam 25 carried by the main driving shaft 22. The gear ratio of the pinion 18 and the gear 19 and the number and spacings of the pins 20 and 24 are such that, for each revolution of the main driving shaft, the copper wires 1 and 2 will be advanced the greater portion of the distance between the feed rolls while the platinum wires 3 and 4 are advanced only a small portion of the said distance, the sum of the distances that the copper and platinum wires are advanced being slightly greater than the final length of the welded wires, for a reason which will be hereinafter more fully set forth. The positions of the cams 21 and 25 upon the driving shaft 22 are also such that the platinum wires are not advanced until a short interval after the copper wires, for a reason which will also hereinafter more fully appear. In order that the feed rolls may remain stationary except when positively actuated by means of the cams 21 and 25, blocks 27 having concave ends are pressed laterally against the bearings of the feed rolls by means of helical compression springs 28, the blocks and springs being inclosed within cartridge-shaped shells 29 having their open ends threaded into the pedestals 9 and 10 so that the pressures exerted by the springs 28 upon the blocks 27 and, in turn, by the blocks upon the feed rolls may be adjusted by turning the shells.

The wires are directed to and from the feed rolls by means of stationary guides 30 that are carried by cross plates 31 secured to the vertical side faces of the pedestals 9 and 10, and they are guided between the rolls by means of separable guide plates 32 and 33, the former of which is grooved and is stationarily supported upon the pedestal 9 and a block 34 that is mounted upon the base 11 between the pedestals 9 and 10 while the plate or table 33 is pivotally connected to the said pedestal and block by means of hinges 36. The plate 33 is provided, at its end near the pedestal 10, with notches and with L-shaped supports for the platinum wires, the copper and platinum wires meeting directly over the notches in the plate 33 and the apertures in the member 38. The plate 33 is adapted to be raised and lowered by means of a link 39 that is pivotally connected thereto at one end and at the other end to a lever 40 that is carried by a shaft 41 having bearings in a block or pedestal 42 upon the base 11. The member 40 is provided with an inclined edge that is interposed in the path of movement of a pin 43 carried by the main driving shaft 22 so that, once for each revolution of the shaft 22, the said member is moved to the right and the table 33 is lowered to effect discharge of the welded wires, the position of the pin 43 with respect to the shaft 22 being such that dropping of the table occurs after completion of the welding operation. In order to normally maintain the table 33 in its horizontal position, laterally projecting pins are secured in the ends of the shaft 41 between the outer ends of which pins and the base 11 helical springs 44 are stretched.

The joined end portions of the wires are periodically severed from the portions thereof that are about to be fed by the rolls by means of stationary knives 45 and 46 that are secured to the pedestals 9 and 10 just inside of the inner stationary guides 30 and pivotally mounted knives 47 and 48 that are normally maintained in their uppermost positions and out of engagement with the stationary knives 45 and 46 by means of helical compression springs 49. The knives 47 and 48 are pressed downward to effect severance of the wires by means of arms 52 and 53, respectively, that are carried by and are rigidly secured to the shaft 41. The arm 52 is provided at its end with a screw 54 that is adapted to bear upon the upper edge of the knife 47 and that provides means for adjusting the operation of the said knife, the screw being secured in any position to which it may be adjusted by means of a lock nut 55. The arm 53 bears upon the end of a link 56 that is secured at its other end to the knife 48. It will be seen that the pin 43, in actuating the member 40, serves not only to lower the table 33, but also to operate the knives 47 and 48 to cut off the welded wires.

The heat for effecting welding of the copper and platinum wires is applied to the wires by a flame that is periodically directed downwardly upon the wires by means of blow pipes 57. The flames play upon the ends of the copper wires immediately after they are advanced and until small balls or globules of molten copper are formed upon their ends, whereupon the platinum wires are advanced and their ends inserted in the molten globules. The flames are then withdrawn to permit of cooling of the copper and completion of the welds, after which the knives 47 and 48 are lowered to sever the wires, and, finally, the table 33 is dropped to permit of discharge of the welded wires. Since the copper wires are slightly shortened by the formation of the molten globules on their ends, and also since the platinum wires are inserted in the globules, the sum of the distances that the copper and platinum wires are advanced is slightly greater than the final length of the joined wires.

Gas and air under pressure are supplied to the blow pipes through tubing 58 and an economizer 59 that comprises a stationary block 60 having a tapered longitudinal aperture 61 and four transverse apertures 62, 63, 64 and 65 communicating with short pieces of metallic tubing 66 that are inserted and secured in the sides of the block and are adapted to receive the ends of the tubing 58. Fitted and secured in the tapered longitudinal aperture in the block is a tapered plug or shaft 67 having transverse apertures 68, 69, 70 and 71, corresponding, respectively, to the transverse apertures in the block 60 and adapted in certain positions of the plug to communicate therewith. The shaft or plug is adapted to be rotated sufficiently to either bring the apertures in the plug and in the block into alinement, or to entirely cut off communication between the apertures in the plug and those in the block, by means of an arm 72 that is maintained, by means of a spring 73, in engagement with the upper edge of a cam 74 carried by the main driving shaft 22, the shape of the cam and the adjustment of the parts being such that communication between the two sets of apertures is established immediately after completion of the forward movement of the copper wires, and is interrupted after the platinum wires have been inserted in the molten balls upon the ends of the copper wires. In order to avoid extinguishment of the flame when the apertures in the block and in the plug do not communicate, by-passes for gas are provided in the economizer by means of vertically drilled recesses 75 that communicate with the transverse apertures in the block on each side of the plug and horizontally drilled holes 76 that cross and communicate with the recesses 75 and the ends of which are plugged. Threaded into the upper ends of the recesses 75 are screws 77 having tapered ends by means of which the amount of gas that may traverse the by-passes may be adjusted.

Upon the main driving shaft 22 is a pulley 78 that is driven by means of a belt 79 from a similar pulley 80 carried by a counter shaft 81 that is, in turn, driven from any suitable source of power by means of a pulley 82 and a belt 83. The counter shaft actuates a pair of auxiliary feed rolls 84 and the main feed rolls 5 and 6 are required only to advance the wires and not to draw them from the reels, the wires being more or less slack between the two sets of feed rolls. This feature is regarded as of considerable importance, as by its use much greater reliability and uniformity of operation are secured than could be otherwise obtained.

I claim as my invention:

1. In a welding machine, the combination with two sets of feed rolls, and means for intermittently actuating the same, of an auxiliary set of feed rolls, and means for actuating the same to maintain the material slack therebetween and one of the sets of main feed rolls.

2. In a welding machine, the combination with two sets of feed rolls, and means for intermittently actuating the same, of an auxiliary set of feed rolls, and means for continuously actuating the same to maintain the material slack therebetween and one of the sets of main feed rolls.

3. In a machine of the class described, the combination with a main set of feed rolls for the material operated upon, and means for actuating the same intermittently, of a continuously actuated auxiliary set of feed rolls for the same material, the machine permitting the material to be slack between the respective sets of feed rolls.

4. In a welding machine, the combination with two sets of feed rolls, of means for momentarily actuating one of said sets to advance a piece of stock therethrough, means for fusing a portion of the protruding stock, and means for thereafter rotating the other pair of feed rolls, whereby another piece of stock is advanced and a portion thereof forced into engagement with the fused portion of the first mentioned stock.

5. In a welding machine, the combination with two sets of feed rolls, of a clamp therebetween, means for momentarily actuating one of said sets to advance a piece of stock therethrough and through the clamp, means for closing the clamp, means for fusing a portion of the protruding stock and means for thereafter rotating the other pair of feed rolls to advance another piece of stock and force a portion thereof into engagement with the fused portion of the first mentioned stock.

6. In a welding machine, the combination with two sets of feed rolls, and means for intermittently actuating the same, of an auxiliary set of feed rolls, and means for continuously actuating the same to maintain the material slack therebetween and one of the sets of main feed rolls, and means for thereafter cutting the welded stock on each side of the weld.

7. In a welding machine, the combination with two sets of feed rolls, of a clamp therebetween, an arm provided with a transversely disposed end member mounted upon one member of the clamp, means for momentarily actuating one of said sets to advance a piece of stock therethrough and through the clamp nearly to said transversely disposed end member, means for closing the clamp, means for fusing the protruding end of the stock, and means for thereafter rotating the other set of feed rolls to advance another piece of stock over said transversely disposed end member and into engagement with the fused portion of the first mentioned stock.

8. In a welding machine, the combination with a clamp, of an arm with a transversely disposed end member mounted upon one member, of the clamp, means for advancing the end of a piece of wire through the clamp and into proximity to said end member, means for closing the clamp, means for fusing the end of the wire, and means for thereafter advancing the end of another piece of wire over said transversely disposed end member and into engagement with said fused end.

9. In a welding machine, the combination with two sets of feed rolls, of a clamp therebetween, means for momentarily actuating one of said sets to advance a piece of stock therethrough and through the clamp, means for closing the clamp, means for fusing a portion of the protruding stock, means for thereafter rotating the other pair of feed rolls to advance another piece of stock and force a portion thereof into engagement with the fused portion of the first mentioned stock, and means for cutting each piece of wire.

10. In a welding machine, a work-holding clamp comprising a horizontally disposed fixed member, a pivotally mounted member thereunder adapted to engage therewith, means for cutting the stock at each end of the clamp, and common means for actuating said cutting means and for opening the clamp, whereby the finished product is severed from the stock and discharged from the machine.

11. In a machine for welding together two pieces of stock a work-holding clamp comprising a fixed member, a pivotally mounted member adapted to coact therewith to hold one of the pieces of stock, an extension carried by the pivotally mounted member adapted to support the other piece of stock during the welding operation, means for cutting one piece of stock at one end of the clamp and for cutting the other piece of stock at the other end of the clamp after the weld is formed, and means for moving the pivotally mounted member, whereby the finished product is discharged from the machine.

12. In a machine for welding together two pieces of stock, a work-holding clamp comprising a fixed member, a pivotally mounted member adapted to coact therewith to hold one of the pieces of stock, an L-shaped extension carried by the pivotally mounted member and adapted to support the other piece of stock while leaving the two ends exposed for welding, means for severing the finished weld from the two pieces of stock, and means for actuating the pivotally mounted member, whereby the clamp is opened and the welded product allowed to drop therefrom.

13. In a welding machine, a work-holding clamp comprising a horizontally disposed fixed jaw, a movable jaw thereunder adapted to coact therewith, means for severing the welded products from the stock at each end of the clamp, and means for actuating the movable jaw, whereby the welded product is allowed to fall from the machine.

In testimony whereof, I have hereunto subscribed my name this 7 day of July, 1909.

GEORGE W. BEADLE.

Witnesses:
ARTHUR S. KNIGHT,
R. C. KORCHNER.

Copies of this patent may be obtained for five cents each, by addressing the "Commissioner of Patents, Washington, D. C."